(12) United States Patent
Reaves et al.

(10) Patent No.: US 6,887,505 B2
(45) Date of Patent: May 3, 2005

(54) ULTRA-HIGH TEMPERATURE PASTEURIZED MILK CONCENTRATE, PACKAGE, DISPENSER AND METHOD OF PRODUCING SAME

(75) Inventors: Ronald A. Reaves, Batavia, OH (US); Ronnie L. Howard, Kettering, OH (US)

(73) Assignee: Moo Technologies, LLC, Batavia, OH (US)

( * ) Notice: Subject to any disclaimer, the term of this patent is extended or adjusted under 35 U.S.C. 154(b) by 173 days.

(21) Appl. No.: 10/254,118

(22) Filed: Sep. 25, 2002

(65) Prior Publication Data

US 2003/0054079 A1 Mar. 20, 2003

Related U.S. Application Data

(63) Continuation-in-part of application No. 09/850,983, filed on May 8, 2001, now abandoned, which is a continuation of application No. 09/433,365, filed on Nov. 3, 1999, now abandoned.

(51) Int. Cl.$^7$ .............................. A23C 9/00; A23C 3/037
(52) U.S. Cl. .................... 426/115; 426/130; 426/330.2; 426/324; 426/587; 426/491; 426/522
(58) Field of Search ................................. 426/587, 324, 426/330.2, 334, 522, 491, 115, 130

(56) References Cited

U.S. PATENT DOCUMENTS

| | | |
|---|---|---|
| 2,473,493 A | 6/1949 | Otting et al. |
| 2,490,599 A | 9/1949 | Otting |
| 2,565,085 A | 8/1951 | Peebles |
| 2,570,231 A | 10/1951 | Hansen |
| 2,663,642 A | 6/1953 | Whitaker et al. |
| 2,712,504 A | 7/1955 | Coulter |
| 2,822,277 A | 2/1958 | Ellertson et al. |
| 2,827,381 A | 3/1958 | Boyd |
| 2,845,350 A | 7/1958 | Wilcox |
| 2,860,057 A | 11/1958 | Wilcox |
| 2,886,450 A | 5/1959 | Stewart, Jr. et al. |
| 3,018,185 A | 1/1962 | Klaessig et al. |
| 3,031,315 A | 4/1962 | Leviton et al. |
| 3,052,555 A | 9/1962 | Stewart et al. |
| 3,065,086 A | 11/1962 | Leviton et al. |
| 3,072,491 A | 1/1963 | Leviton et al. |
| 3,108,875 A | 10/1963 | Bell |
| 3,119,702 A | 1/1964 | Leviton et al. |
| 3,167,437 A | 1/1965 | Leviton et al. |
| 3,666,497 A | 5/1972 | Stewart, Jr. et al. |
| 4,091,118 A | 5/1978 | de Rham ...................... 426/46 |
| 4,282,262 A | 8/1981 | Blake .......................... 426/565 |
| 4,362,756 A | 12/1982 | Williams ..................... 426/587 |
| 4,701,329 A | 10/1987 | Nelson et al. ................ 426/74 |
| 4,842,884 A | 6/1989 | Bookwalter et al. ........ 426/585 |
| 4,851,250 A | 7/1989 | Bronnert ..................... 426/511 |
| 4,921,717 A | 5/1990 | Ranjith ........................ 426/587 |
| 5,223,299 A | 6/1993 | Dalan et al. ................. 426/587 |
| 5,229,159 A | 7/1993 | Schwan ....................... 426/587 |
| 5,260,079 A | 11/1993 | Zettier et al. ................ 426/231 |
| 5,353,963 A | 10/1994 | Gorski et al. ............. 222/129.1 |
| 5,766,666 A | 6/1998 | Streiff et al. ................. 426/587 |

FOREIGN PATENT DOCUMENTS

| | | |
|---|---|---|
| FR | 1085224 | 1/1955 |
| GB | 1405512 | 9/1975 |
| WO | WO 92/21245 | 12/1992 |

OTHER PUBLICATIONS

Tetra Pak, *Tetra Therm Aseptic VTIS Direct UHT treatment module—based on steam injection*, ©1996 Tetra Pak Processing Systems AB, Lund, Sweden.
U.S. Dept of Health & Human Services, *Grade "A" Pasteurized Milk Ordinance*, Public Health Service/FDA Publication No. 229, Section 7, pp. 18–19, 1999 Revision.
D.D. Muir, et al., *Production and properties of in-can sterilised concentrated milk with 39 solids: seasonal effects*, Milchwissenschaft 47(1) 8–11 (1992).
Ronnie L. Howard, et al., *Ultra–High Temperature Milk Concentrate Package and Method of Producing Same*, US 2001/0026825 A1.

Primary Examiner—Steve Weinstein
(74) Attorney, Agent, or Firm—Wood, Herron & Evans, L.L.P.

(57) ABSTRACT

An ultra-high temperature pasteurized liquid (UHT) milk concentrate provides a reconstituted milk beverage that tastes like fresh milk. A direct steam injection process is used to form the UHT milk concentrate having at least about 30% by weight, preferably 35% to 45% by weight, nonfat milk solids having a shelf stability of at least 30 days. The UHT milk concentrate is homogenized and aseptically packaged for subsequent mixing in conventional beverage dispensers with water at volume ratios of about 3:1 to 4:1 of water to concentrate to make a beverage that tastes like fresh milk.

68 Claims, No Drawings

ULTRA-HIGH TEMPERATURE PASTEURIZED MILK CONCENTRATE, PACKAGE, DISPENSER AND METHOD OF PRODUCING SAME

RELATED APPLICATIONS

This application is a continuation-in-part application of U.S. application Ser. No. 09/850,983, filed May 8, 2001 now abandoned, which in turn is a continuation of U.S. application Ser. No. 09/433,365, filed Nov. 3, 1999, now abandoned. The entire disclosures of these applications are incorporated herein by reference.

FIELD OF THE INVENTION

This invention relates to producing and packaging an ultra-high temperature pasteurized milk concentrate for dilution with water and dispensing as reconstituted milk having a fresh taste.

BACKGROUND OF THE INVENTION

The cost of transporting and storing fresh milk is significant because of its short shelf life and weight. Because fresh milk is used extensively by America's military and is one of its largest export commodities, there is a long-felt need for a milk concentrate that has a longer shelf life, a product package with a lesser weight for transportation and storage, and that provides the same physical and taste characteristics of fresh milk when reconstituted.

The prior art addresses various aspects of the UHT pasteurization of milk, the production of condensed milk products, and the reconstituting of concentrated liquid beverages. No known prior art, however, discloses an ultra-high temperature pasteurized liquid milk concentrate which may be packaged for dispensing as a reconstituted milk beverage in existing beverage dispensers or for transporting large amounts of UHT pasteurized milk concentrate worldwide to provide a reconstituted milk at the destination that has the same physical characteristics of and tastes like fresh milk.

U.S. Pat. No. 2,860,057 discloses a known preparation of a sterilized evaporated or condensed milk having a final desired concentration of from about 16% to 35% total solids compared to the standard concentration of about 8.0–8.5% total solids. The different processes each involve forewarming and pasteurizing steps including high-temperature-short-term sterilization after the milk is first concentrated by conventional means. The disclosed processing avoids age thickening or gelation of the milk during high-temperature sterilization effected either before or after packaging in a can. If an aseptic canning method is used, the sterilized concentrate is subsequently homogenized under sterile conditions. Reconstitution involves a complicated dilution, mixing, and color comparison procedure with disclosed mixing volume ratio of water to evaporated milk of 1:1.

U.S. Pat. No. 4,921,717 describes a process for producing UHT sterilized concentrated milk including first sterilizing a partially concentrated milk product and then effecting further concentration of the milk product under sterile conditions. U.S. Pat. No. 4,842,884 describes a formulated milk concentrate made with a mixture of nonfat dry milk solids, water, edible oil and sugar. The concentrate can either be frozen for later use or immediately blended with water to produce a beverage. Once reconstituted, it may be stored for up to about 5 days.

U.S. Pat. Nos. 2,570,231; 3,108,875; 4,362,756; and 5,766,666 respectively disclose a sweetened condensed skim milk, condensed cream, condensed milk having at least 8% milk fat, and a reduced fat and/or fat-free condensed milk each processed differently to produce a novel sweetened condensed dairy product in each instance. The condensed cream is used for a source of fat in ice cream. The other three condensed milk products are used in the baking and confectionary industries and by retail consumers to produce baked goods. U.S. Pat. No. 4,091,118 describes a vegetable-based sweetened condensed milk used as a coffee creamer.

U.S. Pat. No. 2,565,085 discloses the customary forewarming of whole milk to destroy bacteria, molds, yeasts, and the like. The forewarming also helps to maintain the texture of the milk product. Such forewarming of the milk is usually effected at a temperature in the range of 145° F. to 175° F. U.S. Pat. No. 5,260,079 describes a method of and equipment for controlling the content of fat in milk using specified process parameters for mixing skim milk with cream. U.S. Pat. Nos. 5,223,299 and 5,229,159 disclose sterilizing milk without stabilizers and a packaged resultant milk concentrate product for use as coffee creamers. U.S. Pat. No. 4,282,262 discloses a milk blend fraction used as an ingredient component for a two-packet frozen dessert. The milk blend includes sodium hexametaphosphate and carrageenan used together as stabilizers.

In brief, in prior practice ultra-high temperature pasteurized (UHT) milk often had a "scorched" or "burnt" milk taste as a result of the extremely high temperature to which the milk is heated in the UHT process. Milk is an extremely heat-sensitive product, in part, because it contains proteins which become denatured at higher temperatures. Such denaturing of the milk results in the scorched milk flavor whereby it loses its fresh milk taste. While improvements have been made in UHT processing for regular strength solids UHT milk products prior to this invention, it was commonly believed in the dairy industry that the problem of scorching would increase as the solids level in milk increases because, in such a concentrated environment, milk proteins would be more susceptible to denaturing at higher temperatures. Known concentrated milk with high milk solids also has a natural tendency to separate or granulate and turn to gel upon aging. Moreover, reconstitution of such a concentrated milk also may lead to granulation and product separation, thus destroying the taste and mouth feel of regular fresh milk.

SUMMARY OF THE INVENTION

This invention is directed to ultra-high temperature pasteurized (UHT) liquid milk concentrates and methods for producing them. The invention also provides an aseptic UHT milk concentrate package and dispenser for reconstitution with water and dispensing as a fresh milk product.

The objectives and benefits of this invention are achieved by providing a condensed liquid milk blend which includes a stabilizer and a pasteurized liquid milk concentrate having an amount of nonfat milk solids sufficient to produce the UHT liquid milk concentrate having a nonfat milk solids content of at least about 29.9% (i.e., about 30%) by weight when the UHT milk concentrate is reconstituted with water. It has been found that such a high solids liquid milk concentrate may be converted into a UHT milk concentrate by directing a continuous flow of a condensed milk blend into direct contact with steam. The steam is injected directly into the continuous flow of the milk blend at an effective ultrapasteurizing temperature sufficient to form the UHT milk concentrate having a nonfat milk solids content of at least about 30% by weight.

The UHT liquid milk concentrate upon reconstitution with water, at water to concentrate volume ratios in the range of about 3:1 to 4:1, tastes like regular fresh milk. The UHT liquid milk concentrate has (a) an extended shelf stability of at least about 30 days without granulation and/or separation, (b) milk solids which do not separate upon dilution with water, and (c) upon dilution provides a drinkable product which tastes like fresh milk.

Among the other advantages achieved by this invention, the UHT concentrated milk is packaged under aseptic conditions and used in currently available dispensing machines. Other benefits in transportation, military use, commercial and other food service programs are achieved. Other advantages and objectives of this invention will be further understood with reference to the following detailed description.

DETAILED DESCRIPTION OF THE INVENTION

A primary purpose of this invention is to provide an ultra-high temperature pasteurized concentrated liquid milk that has a shelf life of at least about 30 days and, upon dilution with about 3 to 4 volumes of water, the milk solids do not separate and the diluted concentrate has an acceptable taste profile like fresh milk. The stability is obtained without granulation and/or separation of solids, i.e., a lack of sedimentation or crystallization of solids. Hereinafter the ultra-high temperature concentrated liquid milk is sometimes simply referred to as "ultrapasteurized milk concentrate" or "UHT milk concentrate".

The term "fresh" as applied to milk herein means characteristics normally associated with fresh, pasteurized milk, whether it is in the categories of Fat Free, or skim (less than 0.21% fat), Low Fat (1% fat), Reduced Fat (2% fat), or Full Fat (3.25% fat). These milk products are purchased at a store by a consumer who recognizes them as fresh. Consumers have recognition of the inventive products as fresh, as compared to, for example, products such as canned or condensed milk, reconstituted powdered milk, UHT milk, and the like. A consumer would recognize these latter-mentioned products as not fresh. In addition to the consumer test for freshness presently employed in this invention, other sensory tests may be employed to give a sensory description of the inventive milk product. Such other tests usually evaluate the major sensory characteristics of fresh milk which include (a) the presence or absence of visual defects, whether it has visibly separated or coagulated, or changed in color, (b) the aroma and taste, which together contribute to the flavor, and (c) the texture and mouth feel, i.e., free of milk defects which may be described as watery, thin, coagulated, sandy, gritty, or separated.

An extended shelf stability or life of at least about 30 days means that the milk has an acceptable taste profile of fresh milk when either (a) it is held or stored at a temperature of less than about 45° F. according to the Public Health Service/Food and Drug Administration Publication No. 229, entitled, "Grade A Pasteurized Milk Ordinance, Section 7, pages 18–19 (1999 revision) standard for milk (sometimes referred to herein after as "ESL" milk) or (b) it is aseptically packaged and does not require refrigeration for storage at a temperature less than about 85° F., sometimes referred to hereinafter as "aseptic" or aseptically packaged" milk.

Another object of the invention is to provide a packaged concentrated milk product for use in currently available dispensing machines used for reconstituting and dispensing juices.

A further object is to provide a concentrated liquid milk product package that produces substantial cost savings for export, military uses such as for naval ships and submarines, and for commercial and government food service programs.

Still another object of the invention is to provide milk concentrate packages in standard retail pint and quart packages for the general population that yield about ½ gallon for the pint and about one gallon for the quart when reconstituted. In general, concentrate packages having from about 2 to 64 ounces are provided for use.

A still further object of the invention is to provide milk concentrate that is enriched with vitamins and other nutritive ingredients that address special dietetic needs of special groups with dietary restrictions.

Another object is to provide a UHT pasteurized liquid milk concentrate packaged in an amount of up to 300 gallons while gaining shelf-life and economic benefits heretofore unknown in the dairy industry and enabling the on-site destination reconstituting of the concentrate using existing dispensing equipment and otherwise using uncomplicated, simple water to milk concentrate mixing techniques in water to concentrate volume ratios in the range of about 3:1 to 4:1.

In one embodiment, the package comprises a container for a preselected amount of the ultrapasteurized liquid milk concentrate with a structural configuration effective for use with dispensing means which includes means for mixing the ultrapasteurized milk concentrate with water to create a reconstituted milk beverage that tastes like fresh milk. To preferably produce a 1% reconstituted product at a mix ratio of about 3 to 3.7 of water to concentrate, the ultrapasteurized milk concentrate includes a high-solids condensed skim milk (HSCS) in the range of about 87.4% to about 89.4% by weight (more generally about 80% to about 90% by weight) a cream content in the range of from about 8.5% to 10.5% by weight, and a stabilizer content of about 0.7% by weight (based on solids content of stabilizer). To preferably produce a skim milk product at a mix ratio of about 3.25 to 4 of water to concentrate, the ultrapasteurized milk concentrate includes a high solids condensed skim milk (HSCS) in the range of about 96.5% to about 99% by weight, a cream content in the range of about 0 to about 2.5% by weight, and a stabilizer solids content of about 0.75% by weight. To preferably produce 2% and 3.25% reconstituted whole milk products at a mix ratio of about 3 to 3.5 of water to concentrate, the ultrapasteurized milk concentrate includes high solids condensed skim milk (HSCS) range of about 67.5% by weight to about 81% by weight, cream content in the range of about 18% to 31.5% by weight, and a stabilizer content of about 0.6 to about 0.65% by weight. More broadly, in order to produce a spectrum of products of no fat to full fat milk products, mix ratios of about 3 to 4, the high solids condensed skim milk is in the range of about 67 to about 99% by weight, cream is in the range of from about 0 to about 31.5% by weight, and the stabilizer is in the range of about 0.6 to 0.75% by weight. The initially pasteurized condensed skim milk has a total milk solids nonfat (MSNF) content of at least about 30% by weight or more, preferably about 35% to 45% by weight, and cream has a milk fat content of from about 36% to 45% by weight. The stabilizer solids content preferably consists essentially of sodium hexametaphosphate in the range of about 97.0% to 99.0% and carrageenan (kappa type) in the range of about 1.0% to 3.0%. Other stabilizers may be employed to achieve the benefits of this invention in view of this detailed description. In a specific embodiment, the milk concentrate package has a structural configuration effective for disposition of a liquid dispensing means including discharge nozzle means for mixing said ultrapasteurized concentrate with water to dispense the reconstituted liquid milk beverage.

The method for producing the ultrapasteurized liquid milk concentrate of the invention comprises heating a milk starting product to an elevated pasteurizing temperature under reduced pressure for an amount of time sufficient to evaporate liquid from the milk starting product to form a pasteurized, high-solids intermediate liquid milk concentrate. An amount of cream is mixed with the intermediate milk concentrate to form a condensed liquid blend having a preselected amount of fat content to produce the reconstituted milk beverage having the desired taste characteristics.

A final liquid milk concentrate is produced by mixing a sufficient amount of a stabilizer material with a predetermined amount of the condensed liquid blend. The stabilizer material is effective to ensure uniform distribution of and prohibit separation and settling of milk solids in the ultrapasteurized liquid milk concentrate during storage. The stabilizer material is effective to produce a protein complex for forming a stable dispersion of colloidal constituents and to substantially uniformly distribute the colloidal constituents in the final liquid milk concentrate. The stabilizer material maintains the preselected pH of the final liquid milk concentrate in the range of about 6 to 8 during the ultrapasteurizing step. The stabilizer material is further effective for inhibiting thermal coagulation of milk proteins at the preselected pH of the final milk concentrated. The total MSNF content in the final liquid milk concentrate is at least about 30% by weight of the concentrate to produce a reconstituted milk beverage having a MSNF content of at least about 8.25% by weight.

The final liquid milk concentrate is ultrapasteurized to form the ultrapasteurized liquid milk concentrate of the invention. The final homogenizing and packaging of the ultrapasteurized milk concentrate forms the ultrapasteurized liquid milk concentrate package of the invention for subsequent mixing of the ultrapasteurized milk with water to form the desired reconstituted milk beverage.

A feature of the invention is directed to a heating step that includes foreheating the initial liquid milk to an elevated foreheating temperature for a selected time period to produce the milk starting product, which is then heated to the elevated pasteurizing temperature that is higher than the foreheating temperature to produce the desired intermediate liquid milk concentrate. When the initial liquid milk is a skim milk, the elevated foreheating temperature is in a range of about 144° F. to about 152° F. and the elevated pasteurizing temperature is maintained in the range of about 178° F. to 182° F. for a time period in the range from about 16–22 seconds to pasteurize the intermediate milk concentrate.

Another feature is directed to the manner of preparing the stabilizer material for mixing with the condensed liquid blend. In a specific embodiment, the stabilizer material is first solubilized in water under high shear conditions and at an elevated temperature to form a stabilizer slurry that is mixed with the condensed liquid blend to form the final liquid milk concentrate. In the preferred form, the stabilizer slurry includes sodium hexametaphosphate and carrageenan so that when the slurry is mixed with the condensed liquid blend, the carrageenan forms a protein carrageenate complex with milk protein to provide the stable dispersion of colloidal constituents. The sodium hexametaphosphate is effective to aid in substantially uniformly distributing the colloidal constituents and inhibiting thermal coagulation in the concentrate. The stabilizer slurry includes a stabilizer material solids content in the range of about 33 to 35% by weight of the stabilizer slurry to produce a stabilizer material solids content of less than about 1.0% by weight of the final liquid milk concentrate. The stabilizer material includes sodium hexametaphosphate in the range of about 32 to 34.5% of the stabilizer slurry and carrageenan (kappa type) in the range of about 0.3 to about 1% by weight. Other stabilizers may be used as long as they provide the benefits of this invention.

Another feature of the invention is directed to the particular viscosity of the concentrates at different times during the processing. The viscosity of the intermediate liquid milk concentrate is in the range of about 300 to 400 centipoises at 40° to 45° F. and the viscosity of the ultrapasteurized (UHT) milk concentrate is in the range of about 1,000 to 1,500 centipoises at the same temperature range. The pasteurized intermediate liquid milk concentrate includes a milk solids nonfat (MSNF) content preferably in the range of from 35.0% to 36.5% by weight up to about 45% by weight. The pasteurized intermediate liquid milk concentrate thus includes a MSNF content in an amount preferably of at least about 35% to produce a reconstituted low fat milk product upon mixing the ultrapasteurized milk concentrate with water. Moreover, the upper limit of the milk solids nonfat content of about 45% precludes burn damage of the final liquid milk concentrate during the ultrapasteurizing step. Water is mixed with the ultrapasteurized milk concentrate to form the reconstituted milk product in a water/concentrate volume ratio of parts of water to parts of ultrapasteurized milk concentrate in the range of about 3:1 to about 4:1.

Another feature of the invention is directed to the composition of the intermediate liquid milk concentrate that includes intermediate high-solids milk concentrate in the range of from about 67% to about 99% by weight, cream in the range of from about 0 to about 32% by weight, and stabilizer material in the amount of about 0.6 to about 0.75% by weight of the concentrate. The reconstituted milk beverage over the range of non fat to fat milk products includes a milk fat content in the range of less than about 0.21% to 3.25% and a milk solids nonfat content of at least about 8.25% by weight of the milk beverage.

A further feature of the invention is directed to the ultra pasteurizing step that includes heating the intermediate liquid milk concentrate to an elevated ultra pasteurizing temperature by direct contact with steam for a period of time sufficient to form the ultrapasteurized liquid milk concentrate. In particular, it has been found that injecting steam directly into a continuous stream in flow of the intermediate liquid milk concentrate at UHT conditions provides the desired product of this invention. In a specific embodiment, the ultra pasteurizing step includes heating the intermediate liquid milk concentrate to a temperature in the range of about 288° F. to 295° F. for a period of time sufficient to produce an ultrapasteurized liquid milk concentrate of the invention. More specifically, the ultra pasteurizing heating step includes first heating the intermediate liquid milk concentrate to a first elevated temperature of about 180° F. for a period from 30 to 36 seconds and then directing the heated liquid milk concentrate to a direct steam injection zone to be heated to about 290° F. to 295° F. for a period of about 2 to 5 seconds.

The homogenizing step comprises homogenizing the ultrapasteurized milk concentrate in the range of about 3000 psi to about 5000 psi. The packaging step for the ESL milk feature after homogenizing includes the step of cooling the ultrapasteurized milk concentrate to a temperature of less than about 45° F. and filling packaging means with the ultrapasteurized milk concentrate for disposition in a liquid beverage dispenser. In this packaging step, the ultrapasteurized milk concentrate is disposed in a package for use in a beverage dispenser that includes discharge nozzle means for mixing the ultrapasteurized milk concentrate with water to form the desired reconstituted milk beverage. For the aseptically packaged milk, it is at temperatures of about 70° to 90° F., or about 80° F., during packaging. In a further specific embodiment, the packaging step includes disposing up to 300 gallons of the ultrapasteurized milk concentrate in a package container.

In another embodiment of the invention, a preselected amount of liquid skim milk is heated to a temperature in the range of about 144° to 152° F. for an amount of time sufficient to produce a preheated milk starting product. The preheated milk starting product is then pasteurized in the range of about 178° F. to 182° F. in a time period in the range of about 16–22 seconds. The pasteurizing step is effected under a vacuum to evaporate liquid from the milk starting product to produce an intermediate condensed liquid milk including milk solids nonfat in the range of about 35.0% to 36.5% by weight. Cream and stabilizing material are mixed with the intermediate condensed liquid milk to produce a final liquid milk concentrate including a cream content in the range of 8.5% to 10.5% by weight thereof and a stabilizing material content of less than 1.0% thereof. The final liquid milk concentrate is then ultrapasteurized and homogenized to form the ultrapasteurized milk concentrate, which is then disposed in the package container for subsequent reconstitution with water at a water/milk concentrate volume ratio in the range from about 3:1 to 4:1.

In another feature of the method of the invention, a liquid milk starting product is heated under vacuum to an elevate temperature for an amount of time sufficient to pasteurize the milk starting product and evaporate liquid from the milk starting product to form a pasteurized, high-solids condensed liquid skim milk including milk nonfat solids in the range of about 35.0% to 36.5%. An amount of cream is mixed with the pasteurized condensed skim milk to form a final skim milk concentrate. The stabilizer slurry contains sodium hexametaphosphate and carrageenan (kappa type) in amounts sufficient to prohibit separation, settling, and crystallization of milk constituents in the final liquid milk concentrate during storage. The final liquid skim milk concentrate is ultrapasteurized, homogenized and packaged to form an ultrapasteurized milk concentrate package for disposing in a liquid dispensing means including discharge nozzle means for mixing the ultrapasteurized milk concentrate with water to dispense a reconstituted milk beverage.

Procedures and Operating Examples

The ultrapasteurized concentrated milk product of the invention is produced using a direct steam injection process to achieve new and unexpected results. As will be described in more detail hereinafter, the process of the invention is effected using a UHT direct steam injection apparatus as used in the dairy industry. For example, one type of such apparatus used for ultrapasteurization is the direct heating plant in which high pressure potable steam is mixed with the liquid milk product by injecting the steam into the liquid milk product. More specifically, a Tetra Pak VTIS direct steam injection system for UHT pasteurization is used, as described hereinafter. See Tetra Therm Aseptic VTIS Direct UHT treatment module based on steam injection, ©1996, Tetra Pak Processing Systems AB, Lund, Sweden. The water added to the liquid milk product is then removed by evaporation, usually under reduced pressure, which also cools the product. The direct steam injection apparatus provides a continuous ultrapasteurization process.

In a specific embodiment of the invention, the ultrapasteurized milk concentrate is produced in a series of process steps. First, a high solids condensed skim milk (HSCS) is prepared by pasteurizing under vacuum conditions. HSCS and cream are mixed to form about 1,000 to 4000 gallons in a batch tank of a condensed liquid blend having a preselected fat content. A special stabilizer mixture is mixed with warm water under high shear mixing conditions to form a unique stabilizer slurry which is added to the condensed liquid blend to ensure production of a final liquid milk concentrate that will provide a reconstituted milk beverage having the desired taste and milk characteristics. Vitamin A Palmitate and Vitamin D3 are added to the batch, which is then ultrapasteurized and homogenized. The resultant ultrapasteurized milk concentrate is then held in sterile tanks until packaging in an aseptic filler. The ESL milk concentrate of the invention has a refrigerated shelf-life of below about 45° F. for at least about 30 days or preferably about 4 months. The aseptic milk concentrate has a shelf life of at least about 30 days, or preferably about 4 to 6 months, when stored at a temperature of less than about 85° F. The HSCS milk and cream are sources of milk-derived carbohydrates, proteins, and minerals. In addition, the cream brings the desired milk fat content to the UHT pasteurized milk concentrate of the invention.

The process parameters are controlled to maintain the milk solids nonfat content in the HSCS within a critical range and the novel stabilizer system under ultrapasteurization conditions to produce an ultrapasteurized milk concentrate having substantially uniformly distributed milk constituents of at least about 30% by weight MSFN, preferably about 35 to about 45% by weight MSNF that do not separate. And for the first time such a milk concentrate can be reconstituted with water within an available juice or other beverage dispensing system to yield a reconstituted milk product that has the same characteristics of and tastes like fresh milk.

The starting pasteurized skim milk may be acquired in the market place. Alternatively, the initial pasteurization process in a specific embodiment of the invention is continuous and treats a skim milk (less than 0.5% fat content) at a flow rate of 3000 gal/hr. The milk is first preheated for 10 minutes+/−30 seconds at a temperature of about 150° F. within a temperature range of 144° F. to 152° F. The preheated milk is then pasteurized at about 180°+/−2° F. for 16–22 seconds and held for 10 minutes +/−30 seconds under a vacuum of 23+/−0.5 inches of mercury with an air temperature of about 145° F. After pasteurization, the HSCS is directed through a plate cooler for 3 minutes at a flow rate of 800 to 1,000 gal/hr where it is cooled to a temperature of less than 40° F.

Heating the milk under vacuum evaporates liquid and thus produces the desired high solids intermediate condensed skim milk, which includes preferably about 35.0 to 45.0% milk solids nonfat (MSNF), or more, by weight as required for further processing. A lower MSNF content of less than about 30% will not produce an ultrapasteurized milk concentrate required to produce the novel milk beverage of the invention when reconstituted with water. A higher MSNF greater than about 45% may produce excessive viscosity of and "burn-on" in the final liquid milk concentrate as it moves through the ultrapasteurizing equipment.

After the initial pasteurization, the intermediate HSCS milk concentrate is mixed with cream having a fat content in the range of from about 36% to about 45% to form a condensed liquid blend in a batch tank having a capacity of at least 750 gallons. Stabilizer material is then added to the batch of condensed liquid blend to form a final liquid milk concentrate to be subsequently ultrapasteurized. The stabilizers are first mixed under high shear conditions with warm water having a temperature of 95+/−5° F. (90° to 100° F.), preferably about 75° F.±5° F. The resultant stabilizer slurry includes a stabilizer content as stated above.

The initial stabilizer mixture composition used in forming the slurry of the invention consists essentially of sodium hexametaphosphate in the range of 97.0–99.0% and carrageenan (kappa type) in the range of 1.0–3.0%. The stabilizer slurry is formed by metering the stabilizer mixture and water into a high shear liquefier blender and mixing it for about 15 minutes to get the stabilizer material into solution. If the stabilizer is not solubilized, it will not be evenly distributed in the slurry and as required in the final ultrapasteurized milk concentrate of the invention. The desired amounts of Vitamins A Palmitate (250 ml) and D3 (100 ml) are added to the stabilizer slurry during the blending step. The slurry mixture is then pumped into the batch tank and intermixed with the condensed liquid blend of HSCS milk and cream. The viscosity of the final liquid milk concentrate before ultrapasteurization is 300 to 400 centipoises at about 40° to 45° F. After UHT treatment, the viscosity of the UHT milk concentrate is about 1000 to 1500 centipoises at about 40° to 45° F.

Four milk classifications exist in the industry as designated by the government in terms of the percentage of the milk solids fat content as Full Fat (3.25% Fat); Reduced Fat (2.00% Fat); Low Fat (1.00% Fat); and Fat Free (Skim,) (<0.21% Fat). The composition of the final liquid milk concentrate of the invention varies depending on the percentage of fat content desired in the reconstituted milk beverage. The percentage of milk solids, nonfat in each final liquid milk concentrate is at least about 30% to attain at least 8.25% milk solids nonfat content in the reconstituted milk beverage made with the UHT milk concentrate of the invention. The percentage of stabilizer solids in the milk concentrate of the invention in each instance is less than one percent. The following Table I shows the total solids calculated for the UHT pasteurized milk concentrate of the invention based on the concentrate being reconstituted with water in a water to concentrate volume ratio of 3 parts of water to one part milk concentrate.

TABLE I

|  | Full Fat | Reduced Fat | Low Fat | Fat Free (Skim) |
|---|---|---|---|---|
| % Fat | 11.77 | 7.24 | 3.62 | <.74 |
| % Milk Solids Not Fat | =/>29.90 | =/>29.90 | =/>29.90 | =/>29.90 |
| % Stabilizer | <.75 | <.75 | <.75 | <.75 |
| % Total Solids | =/<42.40 | =/<37.89 | =/<33.52 | =/<31.39 |

The following Table II shows the percentage of fat, MSNF, and total solids in reconstituted milk beverages with the characteristics and tastes like any of the four types of fresh milk made by mixing water with the liquid milk concentrate of Table I in a water to concentrate volume ratio of 3:1.

TABLE II

|  | Full Fat | Reduced Fat | Low Fat | Fat Free (Skim) |
|---|---|---|---|---|
| % Fat | 3.25 | 2 | 1 | <.21 |
| % Milk Solids Not Fat | =/>8.25 | =/>8.25 | =/>8.25 | =/>8.25 |
| % Stabilizer | <.21 | <.21 | <.21 | <.21 |
| % Total Solids | =/<11.71 | =/<10.46 | =/<9.46 | =/<8.67 |

A beverage dispenser manufactured by Wilshire bearing the trademark QUANTUM 4000 operates with a plastic bag package containing the liquid milk concentrate of the invention. A peristaltic pump draws the concentrate from the package and discharges it through a dispensing nozzle to mix it with water flowing at a rate effective to reconstitute the concentrate at a mixing ratio of parts of water to parts of concentrate in a volume ratio range of from about 3:1 to about 4:1. The reconstituted milk beverage has the characteristics of and tastes like fresh milk.

In another specific embodiment, for example, the concentrated milk is loaded into a 300 gallon tri-wall aseptic bag-in-box using an INTASEPT bulk bag-in-box to connect to a steam sterilized connector that pierces the exit port on the aseptic 300 gallons in the box. This allows the concentrated milk to retain its aseptic atmosphere when penetrated by the sterile connector. The concentrated sterile milk is then unloaded into a sterile blending tank that holds a combination of 2,000 gallons of both sterile water and concentrated milk. The sterile concentrated milk and water are mixed together in the blending tank at the proper mix ratio to reconstitute the milk to regular strength milk. The milk is still in a sterile atmosphere. The regular strength milk is then pumped into a sterile surge holding tank until being pumped to a dairy packaging machine where the product still remains in a sterile atmosphere. It is then packaged in paper milk cartons.

The 300 gallon bag-in-box has at least a 30 day shelf life, and more preferably at least 4 months, from the date of manufacturing. The paper retail package would have the remaining shelf life of at least about the 90 days minus the time from date of manufacturing to the date the 300 gallon bag-in-box is processed for retail packaging. Since the concentrated aseptic milk has remained in a USDA approved aseptic system, the product does not have to be re-pasteurized. As a new and unexpected result, this system allows for a dairy to be established anywhere in the world that local laws permit at a minimum expenditure compared to regular dairies.

Another embodiment of this process to produce an aseptic shelf stable UHT milk concentrate of the invention starts with a liquid milk concentrate having a nonfat milk solids content in the range of from about 30% to about 45% by weight with an optimum content range of about 36% to 40% by weight to ultimately produce a reconstituted milk beverage by mixing about 3 to 4 parts water to one part of the UHT milk concentrate. The industry-wide fat content classification of the different types of milk is from less than 0.21% up to 3.25% by weight of butterfat thus including fat free (<0.21% fat content) milk, low fat (1% fat content) skim, reduced fat (2% fat content) milk and full fat (3.25% fat content) milk. So, depending on the particular classification desired in the reconstituted milk beverage of the invention, a sufficient amount of cream may be mixed with the starting liquid milk concentrate to provide a condensed liquid milk blend having a sufficient amount of fat content effective to form a reconstituted milk beverage having a fat content of from less than 0.21% up to 3.25% by weight of the reconstituted milk beverage when the ultrapasteurized liquid milk concentrate is reconstituted with water. If a no fat product is desired, no cream or fat is needed in the mixture. The following Examples 1–5 further illustrate the practice of the invention. Vitamin A and D concentrate is added in a minor amount to the ingredients.

EXAMPLE 1

| Skim white Milk (mix ratio 4.0 x) | |
|---|---|
| Ingredients | % by Weight |
| Cream (40% solids) | 2.5 |
| Condensed Skim (40% solids) | 95.2 |
| Stabilizer (0.75% solids mixed with water) | 2.3 |

EXAMPLE 2

| 1% White Milk (mix ratio 3.7 x) | |
|---|---|
| Ingredients | % by Weight |
| Cream (40% solids) | 9.2 |
| Condensed Skim (40% solids) | 88.7 |
| Stabilizer (0.7% solids mixed with water) | 2.1 |

EXAMPLE 3

| 2% White Milk (mix ratio 3.25 x) | |
|---|---|
| Ingredients | % by Weight |
| Cream (40% solids) | 18.3 |
| Condensed Skim (40% solids) | 79.7 |
| Stabilizer (0.065% solids mixed with water) | 2.0 |

EXAMPLE 4

| Whole White Milk (mix ratio 3.0 x) | |
|---|---|
| Ingredients | % by Weight |
| Cream (40% solids) | 31.6 |
| Condensed Skim (40% solids) | 66.6 |
| Stabilizer (0.6% solids mixed with water) | 1.8 |

EXAMPLE 5

| Orange Milk (mix ratio 3.5 x) | |
|---|---|
| Ingredients | % by Weight |
| Cream (40% solids) | 11.0 |
| Condensed Skim (40% solids) | 47.0 |
| Stabilizer (0.7% solids mixed with water) | 1.2 |
| Orange Flavor with color | 0.7 |
| White Grape Concentrate | 10.0 |
| HFCS (sweetener) | 30.0 |
| Buffer salts | 0.1 |

In the Examples 1–5, a stabilizer is first prepared for adding to the liquid milk concentrate to form the condensed liquid milk blend that is to be ultrapasteurized. In these examples, one (1) pound of stabilizer consisting of sodium hexametaphosphate and carrageenan (kappa type) is mixed with two (2) pounds of warm water (70° F. minimum). The resultant mixture is then blended together in a high shear blender for 15 minutes to form a stabilizer slurry, which is then mixed with the initial liquid milk concentrate for at least 15 minutes to produce the condensed liquid milk blend that is to be UHT pasteurized. The stabilizer in the examples is a slurry in water of about 1–2% of the total weight of the condensed liquid milk blend which may include cream, flavor, juice concentrate, sweetener, etc. Up to about 10% by weight of the UHT milk concentrate product may contain a flavor, sweetening agent or juice concentrate. In the case of these products the fresh milk taste still dominates the product upon reconstitution with a flavored, sweetened or juice note added to the product. Such flavors or sweetening agents are selected from the group consisting of caramel, vanilla, hazelnut, cocoa, coffee extract, peach, strawberry, chai tea, vanilla chai, sucralose, aspartame, corn syrup and fructose. Fruit or juice concentrates are selected from the group consisting of peach, orange, strawberry and grape.

The condensed liquid milk blend, with stabilizer and other ingredients, of Examples 1–5 is then continuously run through a Tetra Pak VTIS direct steam injection UHT pasteurization system that uses a prewarming step of about 180° F. for about 30–36 seconds and then heats the milk to a temperature range of from about 288° F. to about 294° F. for 2.5 to 5 seconds. In these examples, the ultrapasteurizing temperature is about 294° F. The UHT milk concentrate is then sent to a cooling condenser, which cools the concentrate to a temperature of from about 80° F. to 90° F. within about 2 to 5 seconds. The UHT milk concentrate is then run through a high-pressure homogenizer, preferably at about 3500 to 5000 psi, or as low as 1500 psi and sent to an aseptic bag filler machine that sterilizes the bag with steam before it is filled with the sterilized UHT milk concentrate. The nozzle and inside lip of the bag is sprayed with $H_2O_2$. The final product is checked for proper milk solids and fat content as well as the proper pH level of about 6–8. The milk concentrate of these examples includes a total milk solids content of from about 40% to about 46% by weight when it is running through the direct steam injection system, homogenizer, and cooling condenser.

The milk products of Examples 1–5, after dilution with water at the mix ratios, when tested for sensory characteristics by consumers, all satisfy the requirements of a fresh milk product. The UHT milk concentrate and the reconstituted product do not exhibit any visible separation or coagulation or change in color. The aroma and taste satisfy the further characteristics of fresh milk without the negative attributes of "cooked", "scorched", "burnt", etc., as described above. Furthermore, the products have the texture and mouth feel of fresh milk without the defects for milk products which may be described as watery, thin, coagulated, sandy, gritty or separated.

While the ULTRA-HIGH TEMPERATURE MILK CONCENTRATE, PACKAGE, DISPENSER AND METHOD OF PRODUCING SAME have been shown and described in detail, it is obvious that this invention is not to be considered as limited to the exact form disclosed, and that changes in detail and construction may be made therein within the scope of the invention without departing from the spirit thereof.

What is claimed is:

1. An ultra-high temperature pasteurized liquid (UHT) milk concentrate for mixing with water to provide a reconstituted milk beverage that tastes like fresh milk comprising an ultra-high temperature pasteurized liquid (UHT) milk concentrate which is produced by directly injecting steam into a condensed liquid milk blend, said concentrate having a nonfat milk solids content of at least about 30% by weight and containing, sodium hexametaphosphate and carrageenan stabilizers in effective amounts to provide (a) an extended shelf stability of at least about 30 days without granulation and/or separation of the milk solids, (b) milk solids which do not separate upon dilution with water, and (c) upon dilution with water provides a drinkable product which has the characteristics of and tastes like fresh milk.

2. The UHT milk concentrate of claim 1 which is diluted with water at a ratio of about 3:1 to about 4:1 of water to concentrate.

3. The UHT milk concentrate of claim 1 wherein said nonfat milk solids content is from about 35% to about 45% by weight.

4. The UHT milk concentrate of claim 1 having a pH in the range of about 6 to 8.

5. The UHT milk concentrate of claim 1 further containing juice concentrate up to about 10% by weight.

6. The UHT milk concentrate of claim 5 containing a juice concentrate from the group consisting of peach, orange, strawberry, coffee extract, and grape.

7. The UHT milk concentrate of claim 1 further containing a flavor or a sweetening agent.

8. The UHT milk concentrate of claim 7 where the flavor or sweetening agent is selected from the group consisting of caramel, vanilla, hazelnut, cocoa, chocolate, coffee extract, peach, strawberry, chai tea, vanilla chai, sucralose, aspartame, corn syrup, and fructose.

9. The UHT milk concentrate of claim 1 wherein said nonfat milk solids (MSNF) content is in an amount to produce a drinkable product having an MSNF of at least about 8.25% by weight.

10. The UHT milk concentrate of claim 1 wherein said nonfat milk solids (MSNF) content is from about 35% to about 45% by weight and said concentrate has a milk fat content of less than about 0.74% to about 12% by weight.

11. The UHT milk concentrate of claim 1 wherein said stability is achieved at a refrigeration temperature of less than about 45° F.

12. The UHT milk concentrate of claim 1 wherein said stability is achieved by aseptic packaging of said concentrate for storage at a temperature of less than about 85° F.

13. The UHT milk concentrate of claim 12 wherein said stability is for a term of at least about 4 months.

14. An aseptic package of an ultra-high temperature pasteurized liquid (UHT) milk concentrate for mixing with water to provide a reconstituted milk beverage that tastes like fresh milk comprising a container containing under aseptic conditions an ultra-high temperature pasteurized liquid (UHT) milk concentrate which is produced by directly injecting steam into a condensed liquid milk blend, said concentrate having a nonfat milk solids content of at least about 30% by weight and containing a sodium hexametaphosphate and carrageenan stabilizers in effective amounts to provide (a) an extended shelf stability of at least about 30 days without granulation and/or separation of the milk solids, (b) milk solids which do not separate upon dilution with water, and (c) upon dilution with water provides a drinkable product which tastes like fresh milk, said container for delivering the UHT milk concentrate for mixing with water to form the drinkable product.

15. The aseptic package of the UHT milk concentrate of claim 14 having a nozzle configured to dispense the UHT milk concentrate with water at a ratio of about 3:1 to about 4:1 of water to concentrate.

16. The aseptic package of the UHT milk concentrate of claim 14 wherein said nonfat milk solids content is from about 35 to about 45% by weight.

17. The aseptic package of the UHT milk concentrate of claim 14 wherein said UHT milk concentrate has a pH in the range of about 6 to 8.

18. The aseptic package of the UHT milk concentrate of claim 14 wherein said UHT milk concentrate further contains juice concentrate up to about 10% by weight.

19. The aseptic package of the UHT milk concentrate of claim 18 containing a fruit juice concentrate from the group consisting of peach, orange, strawberry, and grape.

20. The aseptic package of the UHT milk concentrate of claim 14 wherein said UHT milk concentrate further contains a flavor or a sweetening agent.

21. The aseptic package of the UHT milk concentrate of claim 20 where the flavor or sweetening agent is selected from the group consisting of caramel, vanilla, hazelnut, cocoa, coffee extract, peach, strawberry, chai tea, vanilla chai, sucralose, aspartame, corn syrup and fructose.

22. The aseptic package of the UHT milk concentrate of claim 14 wherein said nonfat milk solids (MSNF) content is in an amount to produce a drinkable product having an MSNF of at least about 8.25% by weight.

23. The aseptic package of the UHT milk concentrate of claim 14 wherein said nonfat milk solids (MSNF) content is from about 35% to about 45% by weight and said concentrate has a milk fat content of less than about 0.74% to about 12% by weight.

24. The aseptic package of the UHT milk concentrate of claim 14 wherein said stability is for a term of at least about 4 months at a temperature of less than about 85° F.

25. A beverage dispenser for delivery of an ultra-high temperature pasteurized liquid (UHT) milk concentrate and mixing with water to provide a reconstituted milk beverage that tastes like fresh milk comprising a container containing an ultra-high temperature pasteurized liquid (UHT) milk concentrate which is produced by directly injecting steam into a condensed liquid milk blend, said concentrate having a nonfat milk solids content of at least about 30% by weight and containing sodium hexametaphosphate and carrageenan stabilizers in effective amounts to provide (a) an extended shelf stability of at least about 30 days without granulation and/or separation of the milk solids, (b) milk solids which do not separate upon dilution with water, and (c) upon dilution with water provides a drinkable product which has the characteristics of and tastes like fresh milk, said container for delivering the UHT milk concentrate for mixing with water and a dispenser having a source of water and a mixer for mixing the water with the UHT milk concentrate from said container to form and deliver the drinkable product which tastes like fresh milk.

26. The beverage dispenser of claim 25 wherein said mixer is configured to dispense the UHT milk concentrate with water at a ratio of about 3:1 to about 4:1 of water to concentrate.

27. The beverage dispenser of claim 25 wherein said nonfat milk solids content is from about 35 to about 45% by weight.

28. The beverage dispenser of claim 25 wherein said UHT milk concentrate has a pH in the range of about 6 to 8.

29. The beverage dispenser of claim 25 wherein said UHT milk concentrate further contains juice concentrate up to about 10% by weight.

30. The beverage dispenser of claim 25 wherein said UHT milk concentrate further contains a flavor or a sweetening agent.

31. The beverage dispenser of claim 30 where the flavor is selected from the group consisting of caramel, vanilla, hazelnut, cocoa, peach, strawberry, chai tea, vanilla chai, sucralose, aspartame, corn syrup, and fructose.

32. The beverage dispenser of claim 25 containing a fruit juice concentrate from the group consisting of peach, orange, strawberry, and grape.

33. The beverage dispenser of claim 25 wherein said nonfat milk solids (MSNF) content is in an amount to produce a drinkable product having an MSNF of at least about 8.25% by weight.

34. The beverage dispenser of claim 25 wherein said nonfat milk solids (MSNF) content is from about 35% to about 45% by weight and said concentrate has a milk fat content of less than about 0.74% to about 12% by weight.

35. A method for producing an ultra-high temperature pasteurized liquid (UHT) milk concentrate for mixing with water to provide a reconstituted milk beverage that tastes like fresh milk comprising
   providing a condensed liquid milk blend containing a sodium hexametaphosphate and carrageenan stabilizers and a pasteurized liquid milk concentrate having an amount of nonfat milk solids sufficient to produce the UHT milk concentrate having a nonfat milk solids content of at least about 30% by weight when said UHT milk concentrate is reconstituted with water,
   said stabilizers being present in effective amounts to form a stable dispersion of said milk solids,
   directing a continuous flow of said stabilized condensed liquid milk blend into direct contact with steam by injecting steam directly into said flow of condensed liquid milk blend at an effective ultra-high pasteurizing temperature for a time sufficient to form said UHT milk concentrate having a nonfat milk solids content of at least about 30% by weight with
   (a) an extended shelf stability of at least about 30 days without granulation and/or separation of the milk solids,
   (b) milk solids which do not separate upon dilution with water, and
   (c) upon dilution provides a drinkable product which tastes like fresh milk.

36. The method as defined in claim 35 wherein said continuous flow directing step includes heating said condensed liquid milk blend in direct contact with said injected steam at a temperature in the range of about 288° F. to about 295° F. for a period of time sufficient to produce said UHT milk concentrate.

37. The method as defined in claim 36 wherein said continuous flow directing step includes first heating said condensed liquid milk blend to a first temperature of about 180° F. for a period of from about 30 to about 36 seconds, and then
   directing the heated condensed liquid milk blend into direct contact with said injected steam at a temperature of about 290° F. to about 295° F. for a period of about 2 to about 5 seconds to form said UHT milk concentrate.

38. The method as defined in claim 35 wherein the viscosity of the condensed liquid milk blend is in the range of 300 to 400 centipoises at about 40° to about 45° F., and the viscosity of the UHT milk concentrate is in the range of 1000 to 1500 centipoises at about 40° to about 45° F.

39. The method as defined in claim 35 wherein said stabilizers are effective to maintain a preselected pH of said condensed liquid milk blend in the range of about 6 to 8.

40. The method as defined in claim 35 wherein said condensed liquid milk blend is provided by first solubilizing said stabilizers in water under high shear conditions and at an elevated temperature to form a stabilizer slurry that is mixed with said pasteurized liquid milk concentrate to form said condensed liquid milk blend.

41. The method as defined in claim 40 wherein said stabilizer slurry includes a sufficient amount of stabilizer to produce said condensed liquid milk blend having a stabilizer content of less than about 1.0% by weight.

42. The method as defined in claim 41 wherein said sufficient amount of stabilizers in said stabilizer slurry is in the range of about 33 to 35% by weight of said stabilizer slurry.

43. The method as defined in claim 41 wherein said stabilizers in said stabilizer slurry consists essentially of sodium hexametaphosphate in the range of about 32 to about 34.5% and carrageenan (kappa type) in the range of about 0.3 to about 1% each by weight of said stabilizer slurry.

44. The method as defined in claim 35 further including the steps of homogenizing said UHT milk concentrate, and then
   packaging said homogenized UHT milk concentrate for subsequent mixing with water to form said reconstituted milk beverage.

45. The method as defined in claim 44 wherein said homogenizing step comprises homogenizing said UHT milk concentrate in a high pressure homogenizer at about 1500 to 5000 psi.

46. The method as defined in claim 44 wherein said packaging step includes the step of cooling said UHT milk concentrate and disposing said UHT milk concentrate in a liquid beverage dispenser with package filling means.

47. The method as defined in claim 44 wherein said packaging step includes disposing said UHT milk concentrate in a package having a discharge nozzle for mixing said UHT milk concentrate with water to form said reconstituted milk beverage.

48. The method as defined in claim 44 wherein said packaging step includes the step of cooling said UHT milk concentrate to a temperature of about 70° F. to about 90° F. and disposing said milk concentrate in an aseptic container.

49. The method as defined in claim 44 wherein said packaging step includes cooling said UHT milk concentrate to a temperature for refrigeration at less than about 45° F.

50. The method as defined in claim 44 wherein said packaging step includes disposing up to 300 gallons of said UHT milk concentrate in an aseptic container.

51. The method as defined in claim 44 wherein said packaging step includes disposing said UHT milk concentrate in a container for subsequent reconstitution with water at a water to milk concentrate mixing volume ratio in the range of about 3:1 to 4:1.

52. The method as defined in claim 35 wherein said condensed liquid milk blend includes a sufficient amount of cream to provide a sufficient amount of fat content effective to form a reconstituted milk beverage having a fat content of from less than 0.21% up to 3.25% by weight of said milk beverage when said UHT milk concentrate is reconstituted with water.

53. The ultra-high temperature pasteurized milk concentrate package as produced by any one of the methods of claims 44, 46, 47, 48, 49, 50, or 51.

54. A method for producing an ultrapasteurized liquid (UHT) milk concentrate to be mixed with water to form a reconstituted milk beverage comprising providing a pasteurized liquid milk concentrate having an amount of nonfat milk solids sufficient to produce said UHT milk concentrate having a nonfat milk solids content of at least 30% by weight when said UHT milk concentrate is reconstituted with water, mixing a sufficient amount of cream with said pasteurized liquid milk concentrate to provide a condensed liquid blend having a sufficient amount of fat content effective to form a reconstituted milk beverage having a fat content of from less than about 0.21% up to 3.25% by weight of said milk beverage when said UHT milk concentrate is reconstituted with water, mixing effective amounts of sodium hexametaphosphate and carrageenan stabilizers with said condensed liquid blend to form a stable dispersion of said milk solids and fat in said condensed liquid blend, and directing a continuous flow of said stabilized condensed liquid milk blend into direct contact with steam by injecting steam directly into said flow of condensed liquid milk blend at an effective ultra-high pasteurizing temperature for a time sufficient to form said UHT milk concentrate having a nonfat milk solids content of at least about 30% by weight with (a) an extended shelf stability of at least about 30 days without granulation and/or separation of the milk solids and fat, (b) milk solids and fat which do not separate upon dilution with water, and (c) upon dilution provides a drinkable product which tastes like fresh milk.

55. The method as defined in claim 54 wherein said stabilizers mixing step includes first solubilizing said stabilizers in water under high shear conditions and at an elevated temperature to form a stabilizer slurry that is mixed with said pasteurized liquid milk concentrate and cream to form said condensed liquid milk blend.

56. The method as defined in claim 55 wherein said stabilizer slurry includes sufficient amounts of stabilizers to produce said condensed liquid milk blend having a stabilizer content of less than about 1.0% by weight.

57. The method as defined in claim 54 wherein said pasteurized liquid milk concentrate includes a nonfat milk solids content in an amount of at least about 35% to 45% by weight.

58. The method as defined in claim 54 wherein said cream includes a milk fat content in the range of about 36% to about 45% by weight.

59. The method as defined in claim 54 wherein said sufficient amount of cream in said cream mixing step is effective to produce a cream content in the range of up to about 31.5% by weight of said condensed liquid milk blend.

60. The method as defined in claim 54 wherein said condensed liquid milk blend includes said liquid milk concentrate in the range of from about 67% to about 99% by weight, cream in the range of from about 0 to about 31.5% by weight, and stabilizers in the amount of about 0.6–0.75% by weight.

61. The method as defined in claim 54 wherein said reconstituted milk beverage includes a milk fat content in the range of from less than 0.21% to 3.25% by weight and a nonfat milk solids content of at least 8.25% by weight.

62. A package of an ultra-high temperature pasteurized liquid (UHT) milk concentrate for mixing with water to provide a reconstituted milk beverage that tastes like fresh milk comprising a container containing an ultra-high temperature pasteurized liquid (UHT) milk concentrate which is produced by directly injecting steam into a condensed liquid milk blend, said concentrate having a nonfat milk solids content of at least about 30% by weight and containing sodium hexametaphosphate and carrageenan stabilizers in effective amounts to provide (a) an extended shelf stability of at least about 30 days without granulation and/or separation of the milk solids, (b) milk solids which do not separate upon dilution with water, and (c) upon dilution with water provides a drinkable product which has the characteristics of and tastes like fresh milk.

63. The package as defined in claim 62 wherein said UHT milk concentrate includes a condensed skim milk having nonfat milk solids of about 35% to 45% by weight, said skim milk in the range of about 67 to 99% by weight, a cream content in the range of up to about 31.5% by weight, and a stabilizers content of less than about 1% by weight.

64. The package as defined in claim 62 wherein said stabilizers content in said UHT milk concentrate is less than about 1% by weight and includes sodium hexametaphosphate in the range of 97.0% to 99.0% by weight of said stabilizer and carrageenan (kappa type) content in the range of 1.0% to 3.0% by weight of said stabilizers.

65. The package as defined in claim 62 wherein said milk concentrate container has a structural configuration effective for disposition in a liquid dispenser including a discharge nozzle for mixing said ultrapasteurized milk concentrate with water to dispense said reconstituted liquid milk beverage.

66. The package as defined in claim 62 wherein said container for said UHT milk concentrate has a capacity up to 300 gallons for storage and shipping.

67. The package as defined in claim 66 wherein the capacity of said container ranges from about 2 ounces to 64 ounces for dilution with water at volume ratios of about 3:1 to about 4:1 to provide the drinkable product.

68. The package as defined in claim 62 wherein said container has a structural configuration effective for use with a dispenser which includes a mixer for mixing said ultrapasteurized milk concentrate with water to form a reconstituted liquid milk beverage that tastes like fresh milk.

* * * * *

UNITED STATES PATENT AND TRADEMARK OFFICE
CERTIFICATE OF CORRECTION

PATENT NO. : 6,887,505 B2
DATED : May 3, 2005
INVENTOR(S) : Ronald A. Reaves et al.

It is certified that error appears in the above-identified patent and that said Letters Patent is hereby corrected as shown below:

Column 13,
Line 2, change "containing, sodium hexametaphosphate" to -- containing sodium hexametaphosphate --.
Line 58, change "containing a sodium hexametaphosphate" to -- containing sodium hexametaphosphate --.
Line 67, change "which tastes like fresh milk" to -- which has the characteristics of and tastes like fresh milk --.

Column 15,
Line 31, change "blend containing a sodium" to -- blend containing sodium --.

Column 16,
Line 20, change "amount of stabilizer" to -- amount of stabilizers --.
Lines 21-22, change "having a stabilizer content" to -- having a stabilizers content --.

Column 17,
Lines 50-51, change "having a stabilizer content" to -- having a stabilizers content --.

Column 18,
Lines 39-40, change "by weight of said stabilizer and" to -- by weight of said stabilizers and --.

Signed and Sealed this

Eighth Day of November, 2005

JON W. DUDAS
*Director of the United States Patent and Trademark Office*